(12) United States Patent
Yoshida et al.

(10) Patent No.: US 7,367,829 B2
(45) Date of Patent: May 6, 2008

(54) POWER SOURCE OUTLET DEVICE

(75) Inventors: Atsushi Yoshida, Aichi-ken (JP); Koji Mizuno, Aichi-ken (JP)

(73) Assignee: Kawamura Electric, Inc., Aichi-ken (JP)

( * ) Notice: Subject to any disclaimer, the term of this patent is extended or adjusted under 35 U.S.C. 154(b) by 147 days.

(21) Appl. No.: 11/192,398

(22) Filed: Jul. 29, 2005

(65) Prior Publication Data
US 2006/0187599 A1     Aug. 24, 2006

(30) Foreign Application Priority Data
Jul. 30, 2004    (JP) .............................. 2004-224596

(51) Int. Cl.
*H01R 13/53*    (2006.01)
*H02H 3/00*    (2006.01)

(52) U.S. Cl. ....................................... 439/181; 361/42

(58) Field of Classification Search ................. 361/42; 439/181, 183
See application file for complete search history.

(56) References Cited

U.S. PATENT DOCUMENTS 5,987,531 A * 11/1999 Ikeda et al. .................... 710/8

6,176,717 B1 * 1/2001 Campolo et al. ........... 439/181
2004/0253859 A1 * 12/2004 Hirata et al. ................ 439/181

FOREIGN PATENT DOCUMENTS

| JP | 09069380 A | * | 3/1997 |
| JP | 9-180805 A | | 7/1997 |
| JP | 2001235504 A | * | 8/2001 |
| JP | 2001-324533 A | | 11/2001 |

* cited by examiner

*Primary Examiner*—Michael Sherry
*Assistant Examiner*—Scott Bauer
(74) *Attorney, Agent, or Firm*—Arent Fox LLP

(57) ABSTRACT

A power source outlet device which can detect a spark discharge which causes occurrence of tracking using a simple circuit and can further break a cable run using a simple circuit. The device includes receiving blades connected with plug blades, a sensor detecting a spark discharge occurring between the connected plug blades, a tracking detecting circuit receiving a spark discharge detecting behavior of the sensor and outputting a tracking occurrence signal, an LED and a buzzer actuated according to the tracking occurrence signal provided thereto, the tracking detecting circuit is constituted of a circuit connected with the sensor and a circuit producing a tracking occurrence signal connected via a first photo-coupler.

15 Claims, 9 Drawing Sheets

POWER SOURCE OUTLET DEVICE

TECHNICAL FIELD

The present invention relates to a power source outlet device provided with a function of detecting occurrence of tracking

BACKGROUND ART

Conventionally, there are devices described in Patent Literature 1 and Patent Literature 2 as a power source outlet device having a function of detecting occurrence of tracking. Patent Literature 1 discloses a technique where two tracking detecting electrodes are disposed between plug insertion holes, an exciting coil of a release relay is connected between the tracking detecting electrodes, and the exciting coil is excited by a tracking current generated between the plug insertion holes so that the release relay behaves to break a cable run.

Patent Literature 2 discloses a technique where a current detecting section, a filter circuit, an A/D converting circuit, a processor, and the like are provided, and determination about occurrence of tracking is made based upon a detected cable run current.

[Patent Literature] JP-A-09-180805
[Patent Literature] JP-A-2001-324533

DISCLOSURE OF THE INVENTION

Problem to be Solved by the Invention

In a constitution described in Patent Literature 1, however, since a conductive plate for tracking detection is exposed to the front surface of an outlet case, malfunction might occur when the conductive plate is in contact with any moisture-containing substance. Also, the conductive plate might be touched by a user's hand, which is not preferable. Moreover, it is difficult to detect a spark discharge (scintillation) occurring between plug blades of a plug, which causes tracking occurrence, and a sensitivity for tracking detection is low. In a constitution described in Patent Literature 2, it is possible to detect a spark discharge, but a circuit is complicated, which results in increase of cost.

In view of these circumstances, the present invention aims to provide a power source outlet device which can detect a spark discharge between plug blades which causes occurrence of tracking, using a simple circuit without disposing a sensor on the surface of an outlet case, and can break a cable run using a simple circuit.

Means for Solving the Problem

In order to solve the problem, the invention of claim 1 is provided in an outlet case with receiving blades which pinch plug blades of a plug to connect the plug to a cable run, a sensor which detects a spark discharge occurring between the plug blades, and a tracking detecting circuit which outputs a tracking occurrence signal based on discharge occurrence information outputted from the sensor, characterized in that a through-hole is provided between plug insertion holes in the outlet case and a sensor is internally provided with the through-hole, whereby discharge between the plug blades is detected via the through-hole.

With the constitution, since the sensor is not exposed to the surface of an outlet, a user does not touch the sensor even when he touches the outlet, which prevents malfunction. Moreover, as spark discharge occurrence is announced based on a tracking occurrence signal, a user can be promoted to take appropriate measures. Further, since a cable run is broken, a fire can be prevented.

The invention of claim 2 is characterized in that the tracking detecting circuit is constituted by connecting a circuit which is connected with the sensor and a circuit which produces a tracking occurrence signal via a first photo coupler in the invention described claim 1.

With the constitution, a spark discharge which causes occurrence of tracking can be detected by a simple circuit.

The invention of claim 3 is characterized by comprising announcing means which is actuated according to the tracking occurrence signal in the invention described in claim 2.

With the constitution, since the tracking occurrence is announced, a user can be promoted to implement proper measures. If such a situation is adopted that only announcement is performed without breaking a cable run, a load connected to a power source is prevented from stopping suddenly, so that high convenience can be achieved.

The invention of claim 4 is characterized by comprising output means which receives the tracking occurrence signal to output a signal externally in the invention described in claim 2.

With the constitution, it is possible to announce the tracking occurrence at a place remote from the power source outlet device, so that a collective control of a plurality of outlet devices can be made possible.

The invention of claim 5 is characterized by comprising a sensor current breaking circuit which receives the tracking occurrence signal to cut off an input current to the sensor in the invention described in claim 1.

With the constitution, such a situation that a discharge current due to a spark discharge occurring between the plug blades becomes easy to flow in the tracking detecting circuit through the sensor can be cancelled, so that the tracking detecting circuit can be protected.

The invention of claim 6 is characterized by comprising a sensor current breaking circuit which receives the tracking occurrence signal to cut off an input current to the sensor in the invention described in claim 2.

With the constitution, such a situation that a discharge current due to a spark discharge occurring between the plug blades becomes easy to flow in the tracking detecting circuit through the sensor can be cancelled, so that the tracking detecting circuit can be protected.

The invention of claim 7 is characterized by comprising a sensor current breaking circuit which receives the tracking occurrence signal to cut off an input current to the sensor in the invention described in claim 3.

With the constitution, such a situation that a discharge current due to a spark discharge occurring between the plug blades becomes easy to flow in the tracking detecting circuit through the sensor can be cancelled, so that the tracking detecting circuit can be protected.

The invention of claim 8 is characterized by comprising a sensor current breaking circuit which receives the tracking occurrence signal to cut off an input current to the sensor in the invention described in claim 4.

With the constitution, such a situation that a discharge current due to a spark discharge occurring between the plug blades becomes easy to flow in the tracking detecting circuit through the sensor can be cancelled, so that the tracking detecting circuit can be protected.

A power source outlet device according to claim 9, characterized by comprising a make and break contact which opens and closes the cable run for a current to the receiving blades and a cable run breaking circuit which causes the make and break contact to perform an opening behavior, where the cable run breaking circuit receives the tracking occurrence signal to cause the make and break contact to perform an opening behavior in the invention described in claim 2.

With the constitution, since the cable run is broken when a spark discharge occurs between the plug blades, a fire due to tracking can be prevented.

A power source outlet device according to claim 10, characterized by comprising a make and break contact which opens and closes the cable run for a current to the receiving blades and a cable run breaking circuit which causes the make and break contact to perform an opening behavior, where the cable run breaking circuit receives the tracking occurrence signal to cause the make and break contact to perform an opening behavior in the invention described in claim 3.

With the constitution, since the cable run is broken when a spark discharge occurs between the plug blades, a fire due to tracking can be prevented. In that case, since such a fact that the cable run has been broken based upon the tracking detection is announced, a user can get the cause of the breaking so that he can be prevented from taking wrong measures.

The invention of claim 11 is characterized in that power to the tracking detecting circuit is supplied from a cable run positioned on a side of a power source regarding the make and break contact and power to the cable run breaking circuit is supplied from a side of the receiving blades regarding the make and break contact, where the tracking detecting circuit and the cable run breaking circuit are connected to each other via a second photo-coupler in the described in claim 9.

With this constitution, even if a constitution including both announcing means and a cable run breaking circuit is employed, tracking occurrence can be announced with a simple circuit constitution, so that a cable run can be broken.

The invention of claim 12 is characterized in that power to the tracking detecting circuit is supplied from a cable run positioned on a side of a power source regarding the make and break contact and power to the cable run breaking circuit is supplied from a side of the receiving blades regarding the make and break contact, where the tracking detecting circuit and the cable run breaking circuit are connected to each other via a second photo-coupler in the described in claim 10.

With this constitution, even if a constitution including both announcing means and a cable run breaking circuit is employed, tracking occurrence can be announced with a simple circuit constitution, so that a cable run can be broken.

Incidentally, the tracking detecting circuit in the invention is constituted to detect a spark discharge between the plug blades, which causes occurrence of tracking, where the term "tracking detection" means detection of a spark discharge occurring between the plug blades accurately.

EFFECT OF THE INVENTION

According to the present invention, since the sensor is not exposed to the surface of an outlet, a user does not touch the sensor even when he touches the outlet, which prevents malfunction. Moreover, a spark discharge occurring between the plug blades can be detected by a simple circuit. Further, even if a circuit constitution including both announcing means and a cable run breaking circuit is employed, tracking occurrence can be announced with a simple circuit constitution, so that a cable run can be broken.

EXPLANATION OF REFERENCE NUMERALS

3 . . . cable run, 4 . . . receiving blade, 5 . . . sensor, 6 . . . tracking detecting circuit, 7 . . . LED (announcing means), 8 . . . buzzer (announcing means), 13 . . . photo-coupler (first photo-coupler), 22 . . . relay (output means), 33 . . . sensor current breaking circuit, 40 . . . make and break contact, 42 . . . cable run breaking circuit, 44 . . . photo-coupler (second photo-coupler), 46 . . . make and break contact, and 47 . . . cable run breaking circuit, 48 . . . plug insertion hole, 49 . . . through-hole.

BEST MODE FOR CARRYING OUT THE INVENTION

Embodiments of the present invention will be explained below in detail with reference to the drawings.

First Embodiment

Figure 1:
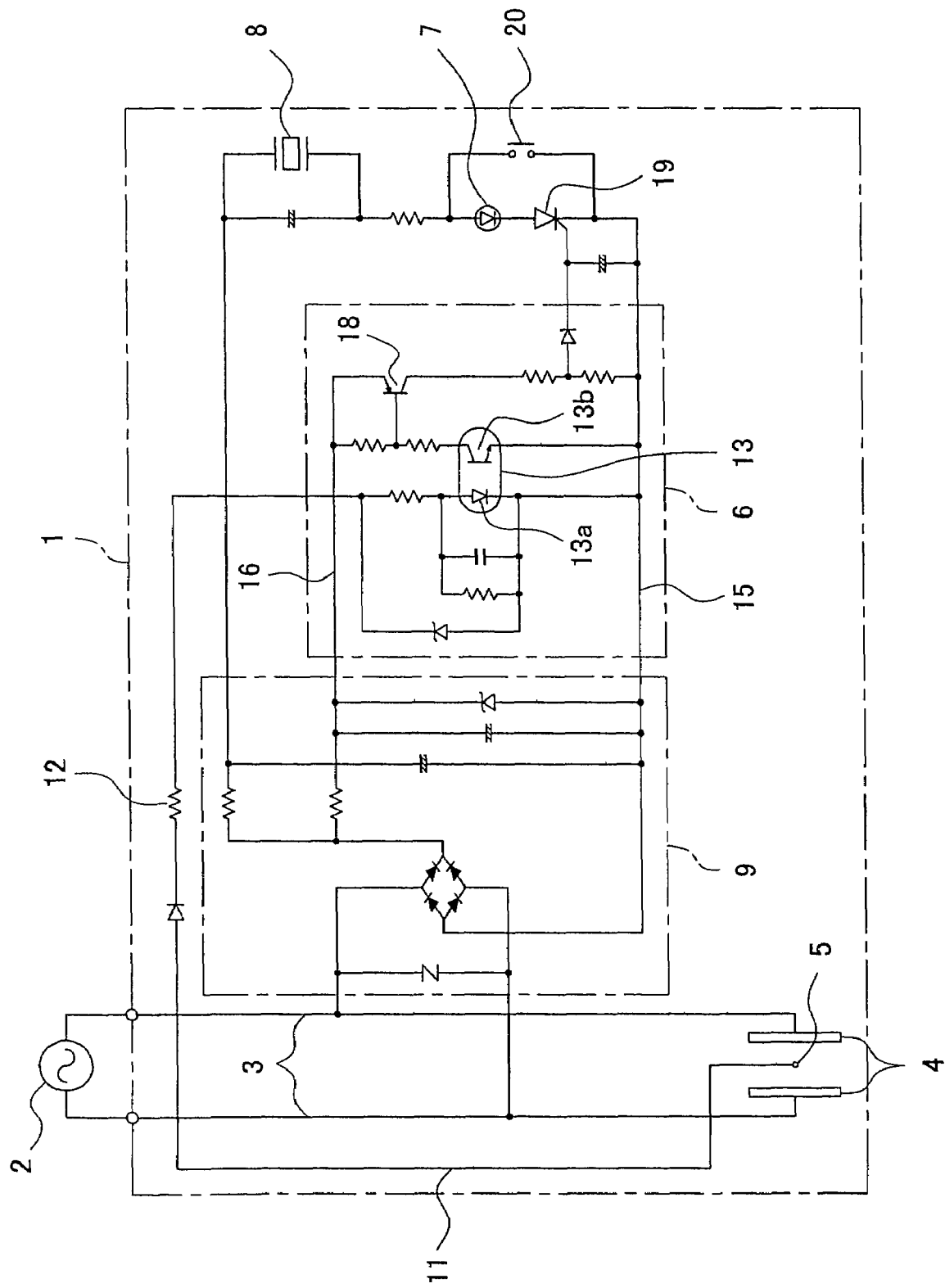
FIG. 1 is a circuit diagram of a power source outlet device showing a first embodiment of the present invention.

FIG. 1 is a circuit diagram showing a first embodiment of a power source outlet device according to the present invention, where reference numeral 1 denotes a power source outlet device, reference numeral 4 denotes receiving blades which pinch plug blades (not shown) of a plug to connect the plug to a cable run 3 connected to an AC power source 2, reference numeral 5 denotes a sensor which detects a spark discharge occurring between the plug blades, reference numeral 6 denotes a tracking detecting circuit which detects tracking based upon an output current from the sensor 5 to output a signal, reference numeral 7 denotes a light emitting diode (LED) serving as announcing means, which is actuated according to an output signal (tracking occurrence signal) from the tracking detecting circuit 6, reference numeral 8 denotes a buzzer serving as an announcing means like the light emitting diode, and reference numeral 9 denotes a power source circuit which supplies power to respective circuits.

The sensor 5 is formed of an electrically conductive member such as a metal piece, and it is disposed between a pair of receiving blades 4 and 4. A signal line 11 connected to the sensor 5 is connected to an anode of a diode 13*a* of a photo-coupler 13 (a first photo-coupler) via a resistor 12, and a cathode of the diode 13*a* is connected to a ground line 15. A collector of a transistor 13*b* of the photo-coupler 13 is connected to a power source line 16, and an emitter thereof is connected to the ground line 15.

The power source outlet device thus constituted performs a tracking detecting behavior in the following manner. When a spark discharge occurs between the plug blades of the plug connected to the receiving blades 4 and the spark discharge comes in contact with the sensor 5, a minute current flows to the ground line 15 via the signal line 11. Thereby, a current flows in the diode 13*a* of the photo-coupler 13 so that the transistor 13*b* of the photo-coupler 13 turns on. As a result, a transistor 18 whose base is connected with a collector of the transistor 13*b* turns on, so that a tracking occurrence signal is outputted from the tracking detecting circuit 6 to a thyristor 19.

The thyristor 19 receives a tracking occurrence signal to turn on so that the LED 7 and the buzzer 8 are energized. As a result, the LED 7 lights and the buzzer 8 sounds, so that occurrence of a spark discharge between the plug blades which causes tracking is announced. Lighting of the LED 7 and sounding of the buzzer 8 are cancelled by pressing a reset switch 20 to turn off the thyristor 19.

Figure 9:
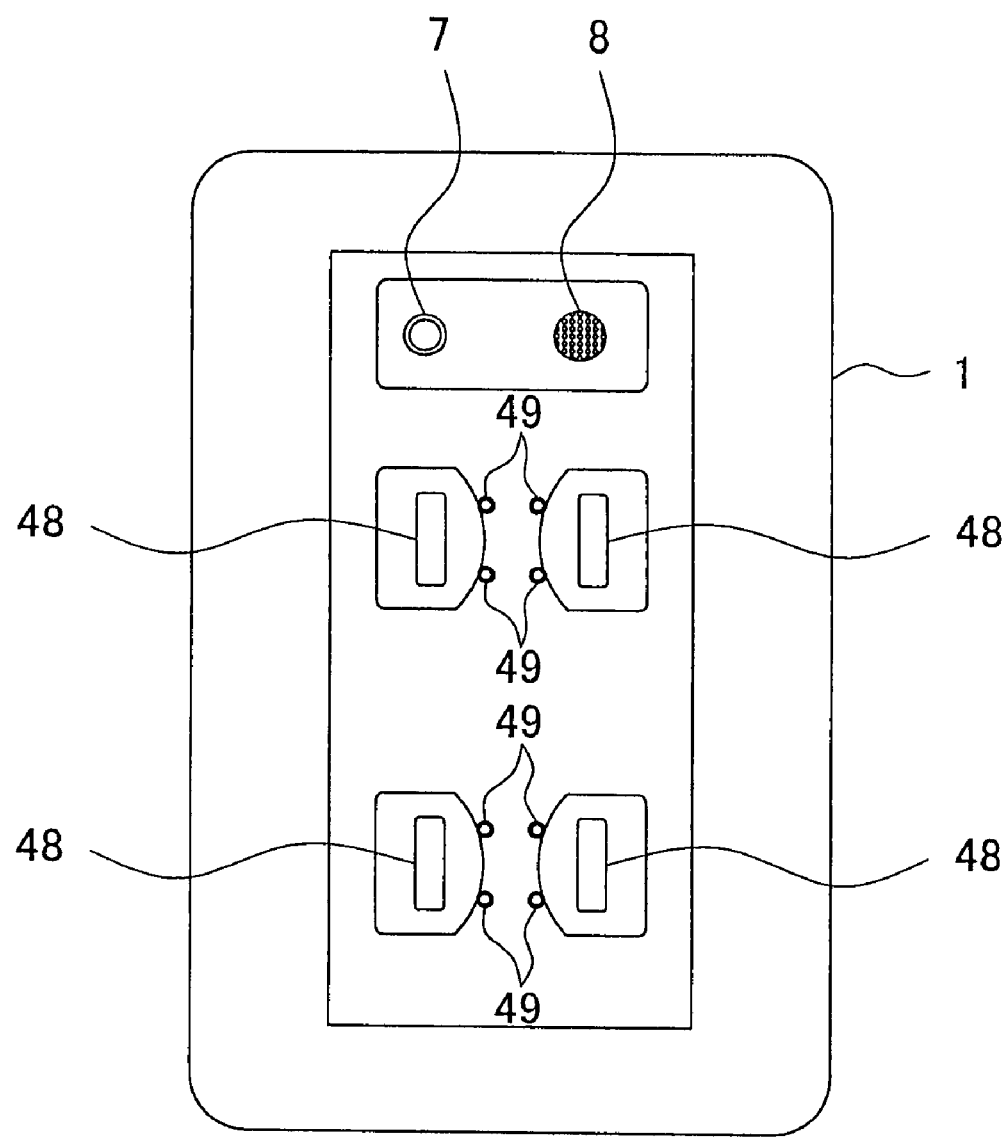
FIG. 9 is a front view of a power source outlet device shown in FIG. 1.

FIG. 9 is a front view showing an example of a power source outlet device 1 in the above-structured circuit. In FIG. 9, the reference number 48 is a plug insertion hole, the reference number 49 is a through-hole for detecting a spark discharge between the plug blades. In this through-hole, a sensor 5 is incorporated. On the upper portion, the LED 7 and the buzzer 8 are disposed.

By connecting a circuit of the tracking detecting circuit to which the sensor is connected and a circuit which generates a tracking occurrence signal via the first photo-coupler in this manner, a spark discharge occurrence can be detected using a simple circuit. By actuating such announcing means as the buzzer, a user can be promoted to take appropriate measures. Since only announce is performed without breaking a cable run, a load connected is prevented from being stopped suddenly, so that high convenience can be achieved.

Moreover, since a spark discharge between the plug blades can be detected without exposing the sensor to the surface of the outlet, the sensor is not touched by a user even when he touches the outlet, which prevents malfunction.

Incidentally, in the embodiment, such a constitution that a combination of the LED 7 and the buzzer 8 is used as the announcing means to perform alarming with sound and light has been adopted. However, for example, mechanical display, voice alarming or the like may be adopted, or alarming may be effected using only the buzzer. Thus, the kind of the announcing means or the number of announcing means to be used can not be limited to the embodiment.

Second Embodiment

Figure 2:
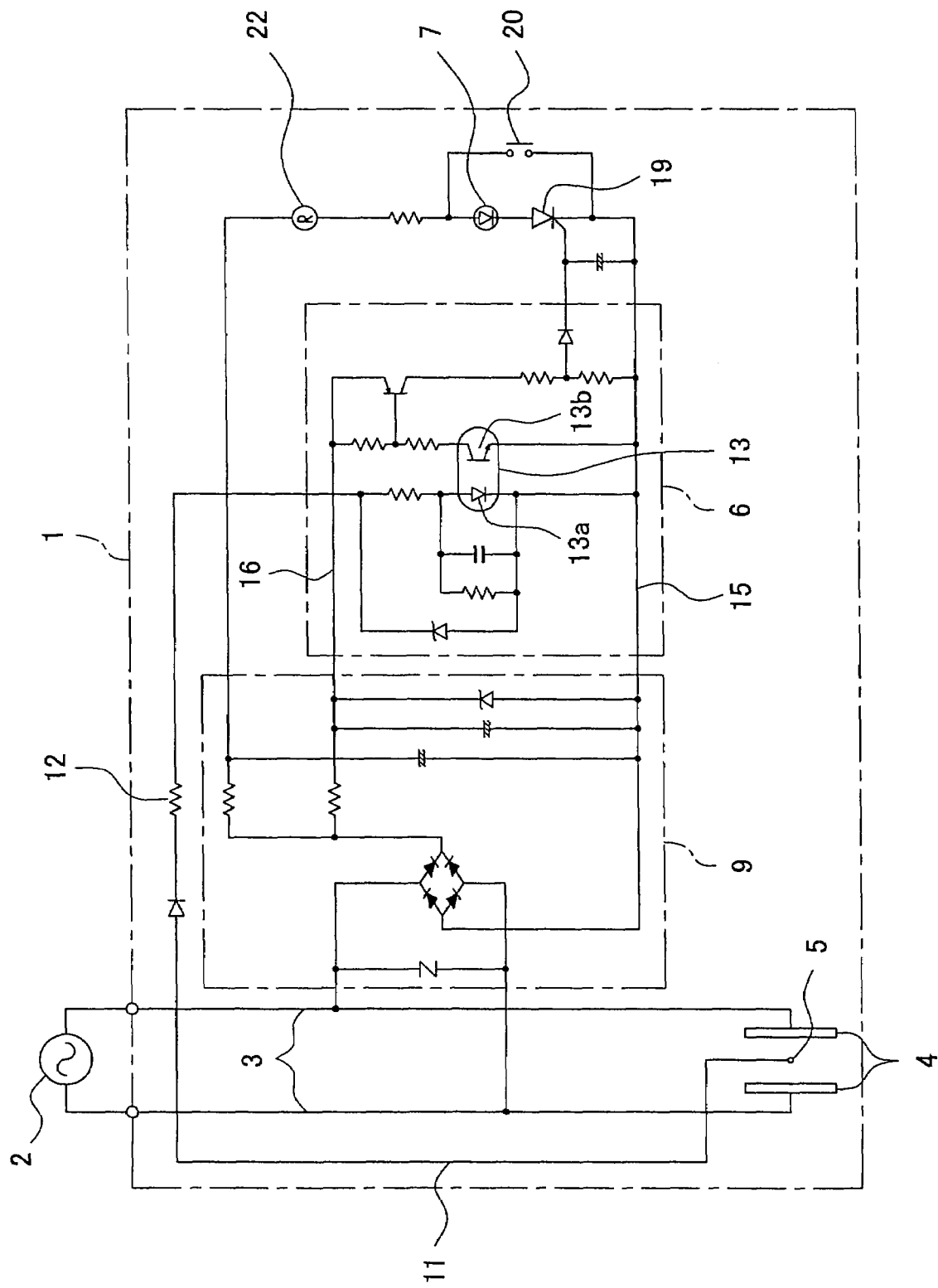
FIG. 2 is a circuit diagram of a power source outlet device showing a second embodiment of the present invention.

A second embodiment of a power source outlet device according to the invention will be explained with reference to FIG. 2. FIG. 2 is a circuit diagram of the power source outlet device. The second embodiment is different from the previous embodiment in that a relay 22 is provided as output means which outputs a signal externally at a time of tracking occurrence. Incidentally, same constituent elements as those in the first embodiment shown in FIG. 1 are attached with same reference numerals, and explanation thereof is omitted.

Figure 3:
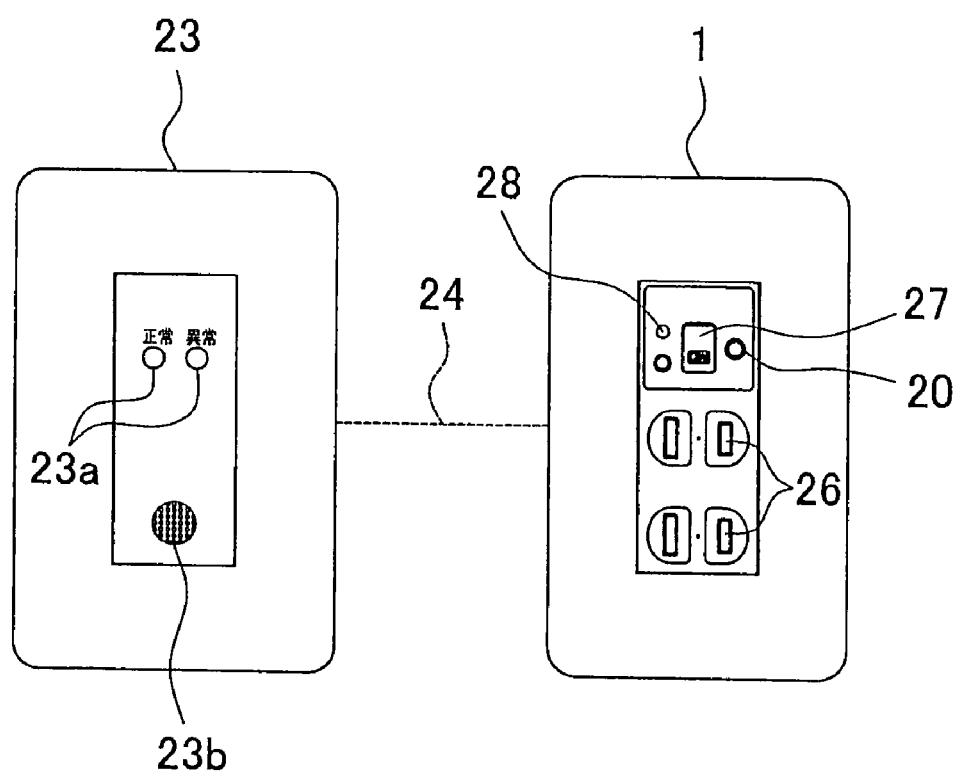
FIG. 3 is an explanatory view showing a connection of the power source outlet shown in FIG. 2 with an alarm unit.

FIG. 3 is an explanatory view showing a connection of the power source outlet device shown in FIG. 2 to an external device. A tracking detecting behavior will be explained with reference to FIG. 3. It should be noted that the power source outlet device 1 in FIG. 3 includes a make and break mechanism which behaves make and break operation of the cable run in addition to the circuit of FIG. 2. In FIG. 3, reference numeral 23 denotes an alarm unit which receives an input of a signal to effect alarming behavior, reference numeral 24 denotes a signal line, reference numeral 26 denotes a plug insertion hole, reference numeral 27 denotes an operation lever for opening and closing a cable run, and reference numeral 28 denotes a display lamp (LED 7), where the relay 22 of the power source outlet device 1 and the alarm unit 23 are connected to each other via the signal line 24. The alarm unit 23 is constituted by a display lamp 23*a* and a buzzer 23*b*.

When a tracking occurrence signal is outputted from the tracking detecting circuit 6, the thyristor 19 turns on, and the relay 22 turns on and the LED 7 emits light according to turning-on of the thyristor 19. A signal is outputted to the signal line 24 according to turning-on of the relay 22, and the alarm unit 23 is actuated so that the display lamp 23*a* and the buzzer 23*b* behave to give warning. Stoppage of the relay 22 is performed by pushing the reset switch 20 to turn off the thyristor 19.

Thus, a spark discharge can be detected using a simple circuit, in which the photo-coupler is actuated according to a current flowing in the sensor due to spark discharge occurrence. Occurrence of tracking can be announced at a place far from the power source outlet device.

Figure 4:
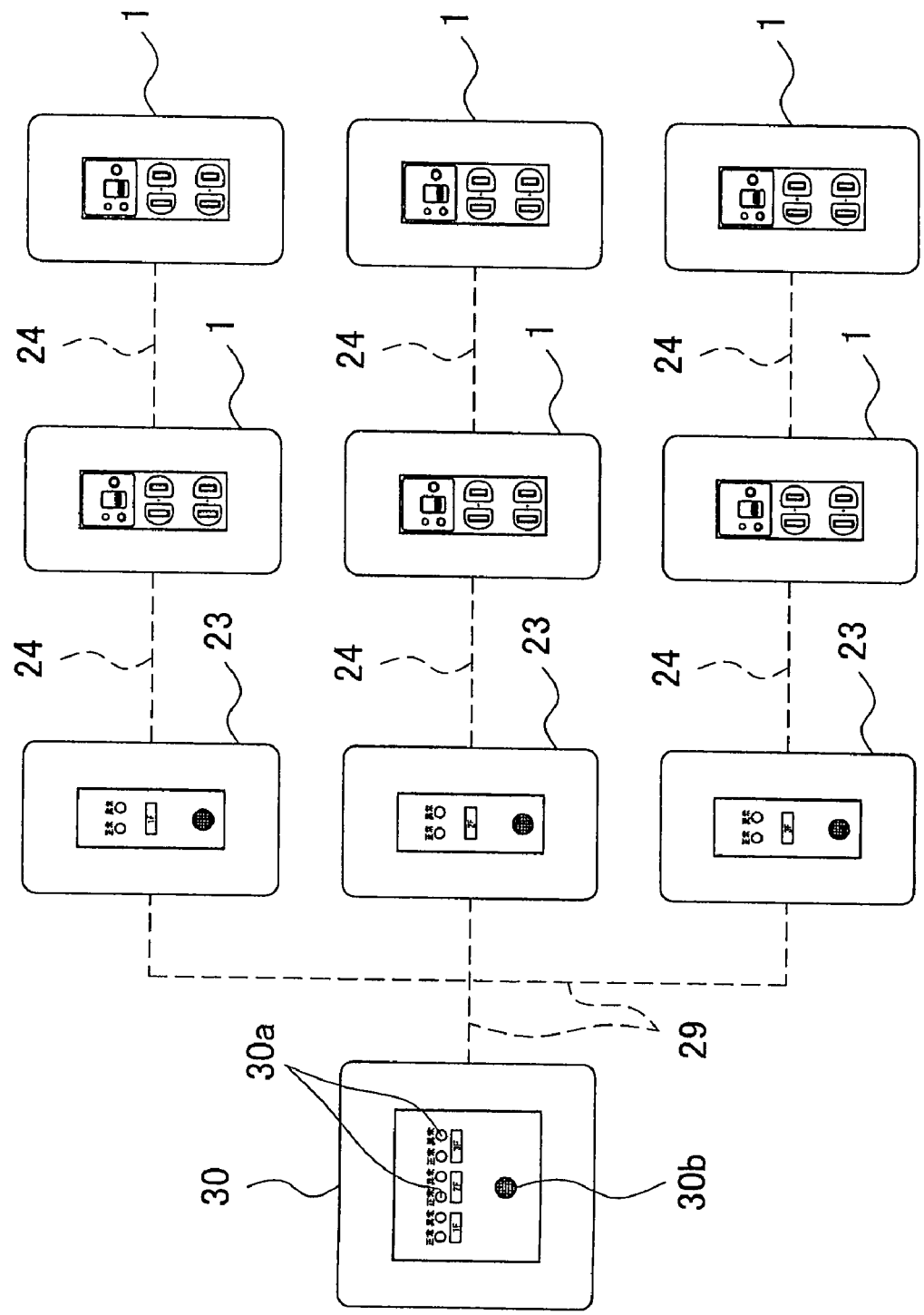
FIG. 4 is an explanatory view showing a connection of the power source outlet shown in FIG. 2 with a plurality of alarm units.

Incidentally, in FIG. 3, the power source outlet device 1 and the alarm unit 23 are caused to correspond to each other in one-on-one manner, but a plurality of power source outlets 1 may be connected to one alarm unit 23. For example, as shown in FIG. 4, alarm units 23 are respectively provided on each floor in a building, and the plurality of alarm units 23 are connected to a central control monitor 30 such as a control room via signal lines 29. At a time of tracking occurrence, an alarm unit 23 on a floor where abnormality has occurred is caused to effect alarming behavior and simultaneously a display lamp 30*a* and a buzzer 30*b* perform alarming on the central control monitor 30. Thus, operation states of the plurality of alarm units 23 can be managed at one place.

Figure 5:
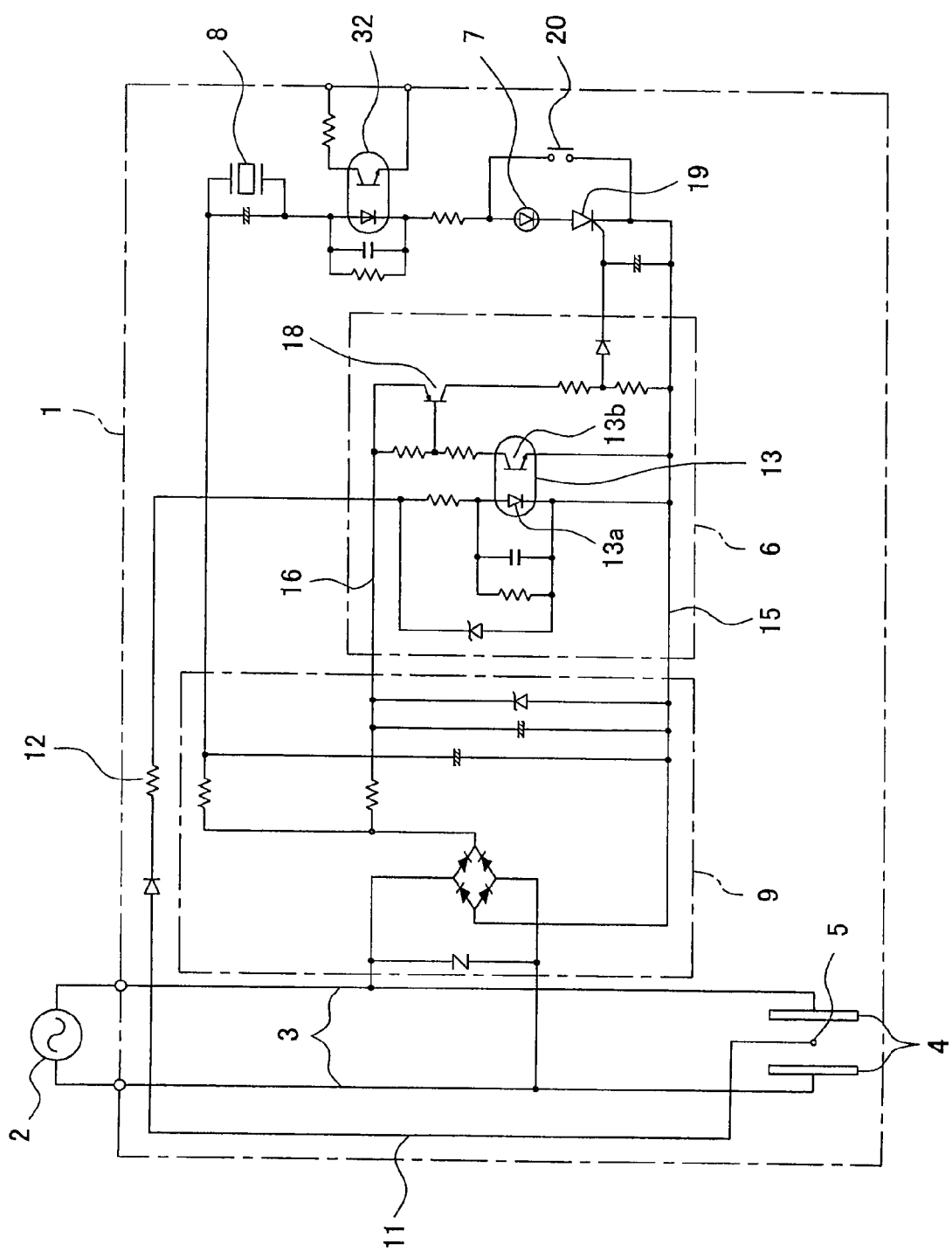
FIG. 5 is a circuit diagram of a power source outlet device showing a modification of the second embodiment.

FIG. 5 is a circuit diagram of a power source outlet device which includes another form of the output means outputting a signal externally. The power source outlet device shown in FIG. 5 has a constitution that an open collector output utilizing a photo-coupler 32 is provided as the output means in the circuit of the first embodiment shown in FIG. 1. Thus, the output means may be constituted of a part or device other than the relay 22. Further, when the output means is provided on the power source outlet device, it is unnecessary to provide the announcing means in the power source outlet device itself.

Third Embodiment

Figure 6:
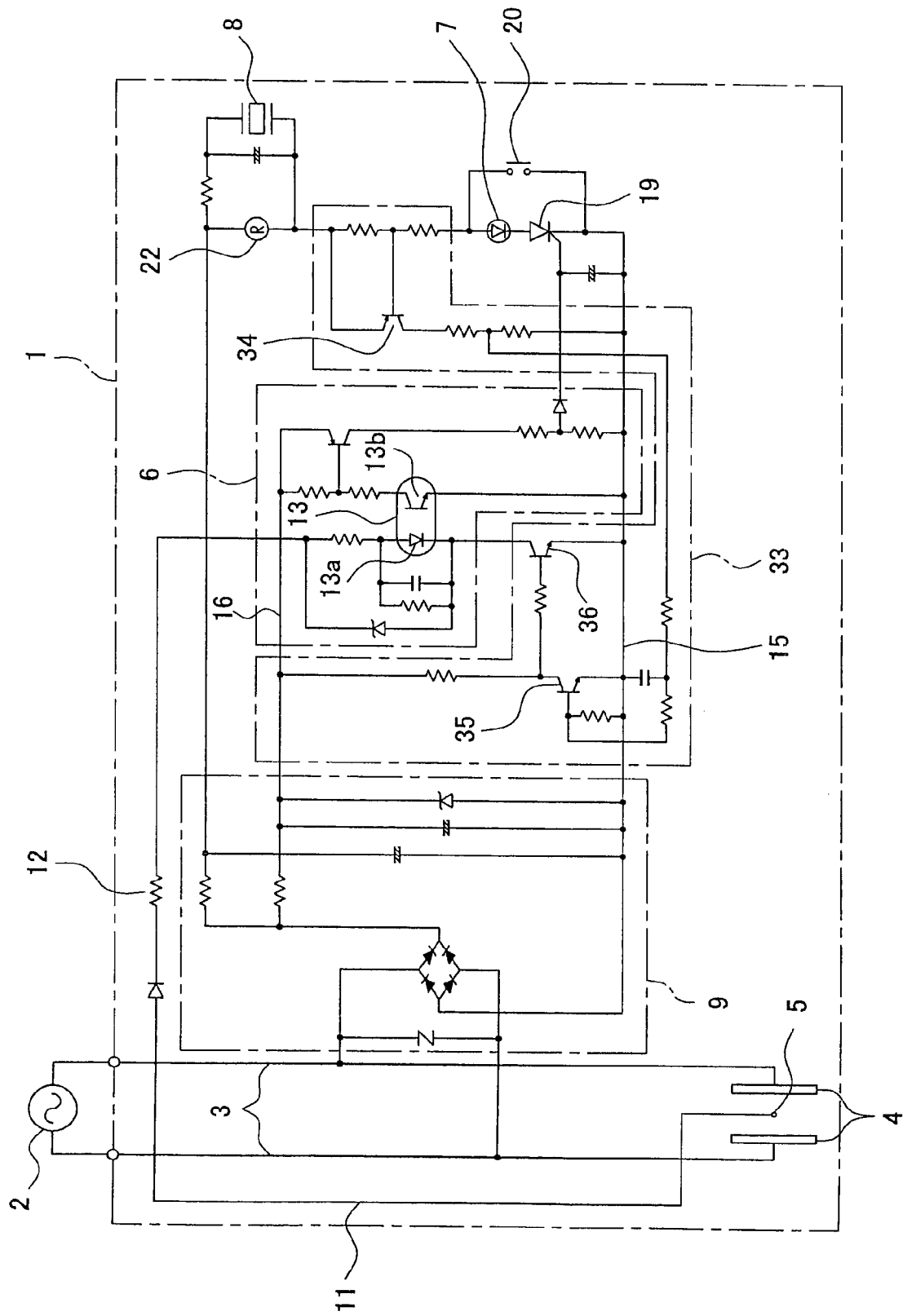
FIG. 6 is a circuit diagram of a power source outlet device showing a third embodiment of the present invention.

A third embodiment of a power source outlet device according to the invention will be explained with reference to a circuit diagram shown in FIG. 6. This embodiment is different from the embodiment shown in FIG. 1 in that a relay 22 are provided as the output means which outputs a signal externally at a time of tracking occurrence, and a sensor current breaking circuit 33 which cuts off an output current from the sensor 5 when a tracking occurrence signal is outputted from the tracking detecting circuit 6 is further provided. Incidentally, same constituent elements as those in the first embodiment shown in FIG. 1 are attached with same reference numerals and explanation thereof is omitted.

The sensor current breaking circuit 33 is mainly constituted of a first transistor 34 of PNP type whose base and emitter are connected to an anode of the thyristor 19 which actuates the LED 7, the buzzer 8, and the relay 22, and whose collector is connected to the ground line 15, a second transistor 35 of NPN type whose base is connected to the collector of the first transistor 34, whose collector is connected to the power source line 16, and whose emitter is connected to the ground line 15, and a third transistor 36 whose base is connected to the collector of the second transistor 35, whose collector is connected to the cathode of the diode 13*a* of the photo-coupler 13, and whose emitter is further connected to the ground line 15.

The sensor current breaking circuit 33 behaves in the following manner. While no tracking occurrence signal is outputted from the tracking detecting circuit 6, the first transistor 34 is off, the second transistor 35 is off, and the third transistor 36 is on. In this situation, when a tracking occurrence signal is outputted from the tracking detecting circuit 6, the thyristor 19 turns on, and the first transistor 34 turns on according to turning-on of the thyristor 19. The second transistor 35 turns on according to tuning-on of the first transistor 34, and the third transistor 36 turns off according to turning-on of the second transistor 35. As a result, current flow from the sensor 5 is cut off, so that even if a spark discharge occurs between the plug blades, a current is prevented from flowing in the sensor.

Thus, such a state that a discharge current becomes easy to flow in the tracking detecting circuit via the sensor can be cancelled, so that the circuit can be protected.

Incidentally, the sensor current breaking circuit 33 is mainly constituted of three transistors in the embodiment, but any constitution that when a signal is outputted from the tracking detecting circuit 6, an input current to the sensor 5 can be cut off can be adopted and the circuit constitution is not limited to a specific one.

Fourth Embodiment

Figure 7:
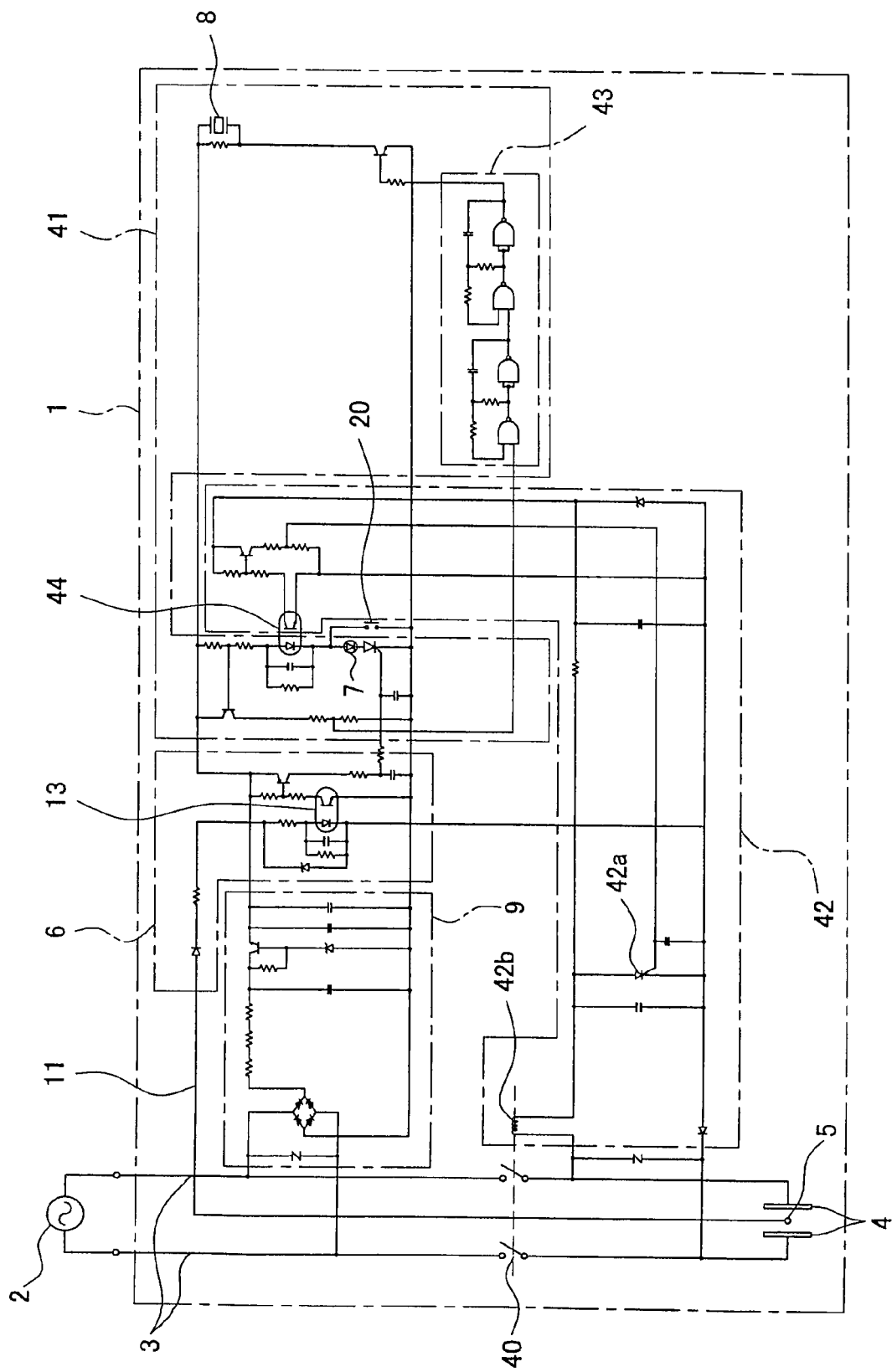
FIG. 7 is a circuit diagram of a power source outlet device showing a fourth embodiment of the present invention.

A fourth embodiment of the invention will be explained with reference to a circuit diagram shown in FIG. 7. This embodiment is different from the embodiment shown in FIG. 1 in that a constitution for breaking a cable run is provided in addition to the constitution for announcing occurrence of tracking. In FIG. 7, reference numeral 40 denotes a make and break contact for opening and closing the cable run, reference numeral 41 denotes an announcing means driving circuit, and reference numeral 42 denotes a cable run breaking circuit for opening the make and break contact 40. Incidentally, same constituent elements as those in the first embodiment shown in FIG. 1 are attached with same reference numerals and explanation thereof is omitted.

The make and break contact 40 is provided on the side of the receiving blades 4 regarding the power source circuit 9 which drives the tracking detecting circuit 6 and the announcing means driving circuit 41, and it is provided on the side of the power source regarding a driving power source supplying portion of the cable run breaking circuit 42. The announcing means driving circuit 41 is provided with a buzzer actuating circuit 43 which actuates the buzzer 8, and a photo-coupler (a second photo-coupler) 44 whose collector output is connected to the cable run breaking circuit 42. The cable run breaking circuit 42 has a thyristor 42*a* which receives an output signal from the photo-coupler 44 to behave and a magnet coil 42*b* which opens (disconnects) the make and break contact 40 according to turning-on of the thyristor 42*a*.

With such a constitution, when the tracking detecting circuit 6 outputs a tracking occurrence signal, the LED 7 lights, the buzzer 8 sounds, and the photo-coupler 44 turns on. As a result, the thyristor 42*a* turns on and the magnet coil 42*b* effects a disconnecting behavior, the make and break contact 40 effect opening behavior so that the cable run 3 is broken.

Thus, since the cable run is broken when a spark discharge occurs, fire due to tracking can be prevented from occurring. In this case, since such a fact that the cable run has been broken according to tracking detection is announced, a user can get the cause of the breaking so that he can be prevented from taking wrong measures.

Further, by providing the power source for the tracking detecting circuit and the announcing means driving circuit in the cable run positioned on the side of the power source regarding the make and break contact, an announcing behavior of the announcing means can be continued even after disconnection of the cable run. In addition, tracking occurrence can be announced and the cable run can be broken with a simple circuit constitution by electrically disconnecting the announcing means and the cable run breaking circuit by a photo-coupler.

Fifth Embodiment

Figure 8:
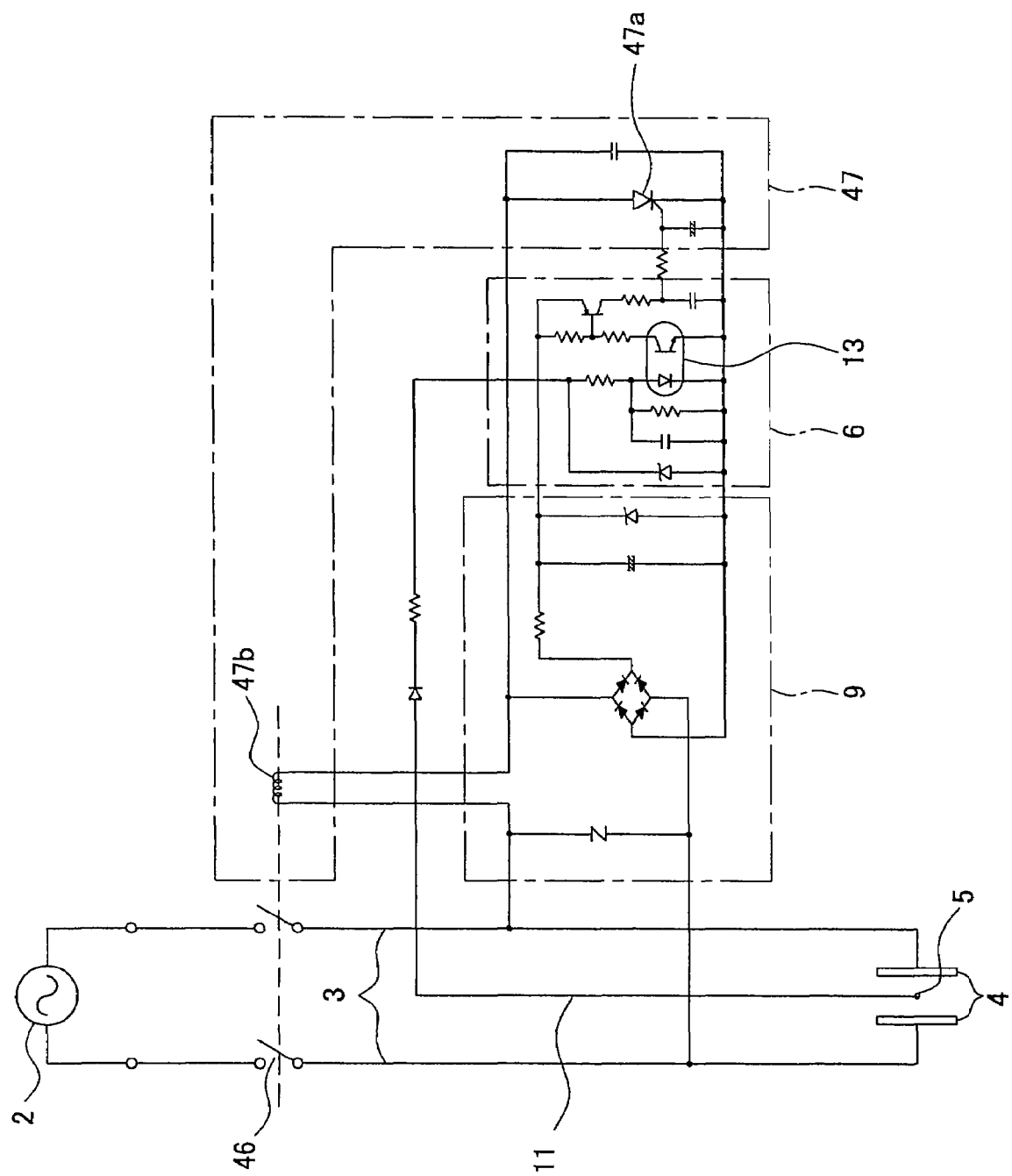
FIG. 8 is a circuit diagram of a power source outlet device showing a fifth embodiment of the present invention.

A fifth embodiment of the invention will be explained with reference to a circuit diagram shown in FIG. 8. In FIG. 8, reference numeral 46 denotes a make and break contact which opens and closes the cable run 3, and reference numeral 47 denotes a cable run breaking circuit which opens (disconnects) the make and break contact 46. Incidentally, same constituent elements as those in the first embodiment shown in FIG. 1 are attached with same reference numerals and explanation thereof is omitted.

The cable run breaking circuit 47 has a thyristor 47*a* which receives a tracking occurrence signal outputted from the tracking detecting circuit 6 to turn on and a magnet coil 47*b* which effects disconnecting 47*b* which effects disconnecting behavior according to turning-on of the thyristor, and it is constituted so as to disconnect the cable run 3 when a tracking occurrence signal is outputted from the tracking detecting circuit 6.

Thus, such a constitution that disconnection is simply conducted without providing the announcing means or the like can be adopted, and a tracking activated power source outlet device can be constituted by a simple circuit constitution.

The invention claimed is:

1. A power source outlet device which is provided in an outlet case with receiving blades which pinch plug blades of a plug to connect the plug to a cable run, the power source outlet device comprising:

a sensor which detects a spark discharge occurring between the plug blades;

a tracking detecting circuit which outputs a tracking occurrence signal based on discharge occurrence information outputted from the sensor;

a through-hole defined between plug insertion holes in the outlet case, wherein the sensor is internally provided within the through-hole wherein discharge between the plug blades is detected via the through-hole; and a sensor current breaking circuit which receives the tracking occurrence signal to cut off an input current to the sensor.

2. The power source outlet device according to claim 1, wherein the tracking detecting circuit is constituted by connecting a first circuit connected with the sensor and a second circuit which produces a tracking occurrence signal via a first photo coupler.

3. The power source outlet device according to claim 1, further comprising announcing means which is actuated according to the tracking occurrence signal.

4. The power source outlet device according to claim 1, further comprising output means which receives the tracking occurrence signal to output a signal externally.

5. The power source outlet device according to claim 2, further comprising a sensor current breaking circuit which receives the tracking occurrence signal to cut off an input current to the sensor.

6. The power source outlet device according to claim 1, further comprising a sensor current breaking circuit which receives the tracking occurrence signal to cut off an input current to the sensor.

7. The power source outlet device according to claim 4, further comprising a sensor current breaking circuit which receives the tracking occurrence signal to cut off an input current to the sensor.

8. The power source outlet device according to claim 2, further comprising a make and break contact which opens and closes the cable run for a current to the receiving blades and a cable run breaking circuit which causes the make and break contact to perform an opening behavior, wherein the cable run breaking circuit receives the tracking occurrence signal to cause the make and break contact to perform an opening behavior.

9. The power source outlet device according to claim 1, further comprising a make and break contact which opens and closes the cable run for a current to the receiving blades and a cable run breaking circuit which causes the make and break contact to perform an opening behavior, wherein the cable run breaking circuit receives the tracking occurrence signal to cause the make and break contact to perform an opening behavior.

10. The power source outlet device according to claim 8, wherein power to the tracking detecting circuit is supplied from a cable run positioned on a side of a power source regarding the make and break contact and power to the cable run breaking circuit is supplied from a side of the receiving blades regarding the make and break contact, wherein the tracking detecting circuit and the cable run breaking circuit are connected to each other via a second photo-coupler.

11. The power source outlet device according to claim 9, wherein power to the tracking detecting circuit is supplied from a cable run positioned on a side of a power source regarding the make and break contact and power to the cable run breaking circuit is supplied from a side of the receiving blades regarding the make and break contact, wherein the tracking detecting circuit and the cable run breaking circuit are connected to each other via a second photo-coupler.

12. The power source outlet device according to claim 1, further comprising announcing means which is actuated according to the tracking occurrence signal.

13. The power source outlet device according to claim 1, further comprising output means which receives the tracking occurrence signal to output a signal externally.

14. The power source outlet device according to claim 1, further comprising a make and break contact which opens and closes the cable run for a current to the receiving blades and a cable run breaking circuit which causes the make and break contact to perform an opening behavior, wherein the cable run breaking circuit receives the tracking occurrence signal to cause the make and break contact to perform an opening behavior.

15. The power source outlet device according to claim 14, wherein power to the tracking detecting circuit is supplied from a cable run positioned on a side of a power source regarding the make and break contact and power to the cable run breaking circuit is supplied from a side of the receiving blades regarding the make and break contact, wherein the tracking detecting circuit and the cable run breaking circuit are connected to each other via a second photo-coupler.

* * * * *